United States Patent
Yoshida et al.

(10) Patent No.: US 8,148,674 B2
(45) Date of Patent: Apr. 3, 2012

(54) OPTICAL ENCODER FOR DETECTING RELATIVE ROTATION ANGLE FOR TWO MEMBERS

(75) Inventors: Yasushi Yoshida, Fukuoka (JP); Yuji Arinaga, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 558 days.

(21) Appl. No.: 12/293,862

(22) PCT Filed: Mar. 15, 2007

(86) PCT No.: PCT/JP2007/055247
§ 371 (c)(1),
(2), (4) Date: Mar. 24, 2009

(87) PCT Pub. No.: WO2007/108398
PCT Pub. Date: Sep. 27, 2007

(65) Prior Publication Data
US 2009/0321621 A1    Dec. 31, 2009

(30) Foreign Application Priority Data

Mar. 20, 2006  (JP) ................................ P2006-076236

(51) Int. Cl.
*G01D 5/34* (2006.01)
(52) U.S. Cl. ................................................. 250/231.13
(58) Field of Classification Search ............... 250/231.1, 250/231.13–231.18, 233; 356/614–617, 356/138, 139.02, 139.05, 139.07; 702/150, 702/151, 163; 33/1 N, 1 PT
See application file for complete search history.

(56) References Cited

U.S. PATENT DOCUMENTS 4,757,196 A * 7/1988 Yamada et al. .......... 250/231.13
5,073,710 A * 12/1991 Takagi et al. ............ 250/231.14

FOREIGN PATENT DOCUMENTS

| JP | 56-14112 A | 2/1981 |
| JP | 61-212727 A | 9/1986 |
| JP | 3-89113 A | 4/1991 |
| JP | 3-137517 A | 6/1991 |
| JP | 9-133552 A | 5/1997 |
| JP | 10-206189 A | 8/1998 |

* cited by examiner

Primary Examiner — Georgia Y Epps
Assistant Examiner — Renee Naphas
(74) Attorney, Agent, or Firm — Sughrue Mion, PLLC

(57) ABSTRACT

An optical encoder, with a simple structure, that can output a high-precision origin signal is provided.

Rotary origin phase slits (112), which are formed into a pattern of linear slits arranged in parallel at equal pitches, are prepared for a rotary disk (110), while fixed origin phase slits (122), which are formed into a pattern of linear slits arranged in parallel at equal pitches, are prepared for a fixed origin phase scale (120). Light emitted by a light source (130) passes through an ejection window (121) and irradiates the rotary origin phase slits (112). The light reflected at the rotary origin phase slits (112) passes through the fixed origin phase slits (122) and is detected by a light-receiving element (140). Then, based on the detection signal, an origin signal is generated.

8 Claims, 14 Drawing Sheets

OPTICAL ENCODER FOR DETECTING RELATIVE ROTATION ANGLE FOR TWO MEMBERS

TECHNICAL FIELD

The present invention relates to an optical encoder employed for a sensor, for positioning a rotary apparatus such as a motor, and relates particularly to an optical encoder that includes an origin detection function.

BACKGROUND ART

Conventional Example 1

A reference position signal generator is conventionally disclosed, wherein a first grid having predetermined grid pitches and a second grid having integer times the predetermined grid pitches are individually formed for a main scale and a reading scale, and wherein the detection outputs of the first grid and the second grid are synthesized to generate an origin signal (see, for example, patent document 1).

FIG. 19 is a perspective view of the arrangement of a conventional reference position signal generator.

Referring to the drawing, reference numeral 210 denotes a main scale and reference numeral 220 denotes a reading scale. First grids 211 and 221, second grids 212 and 222, and third grids 213 and 223, each of which is formed of a light transmitting portion and a non-light transmitting portion, are individually provided for the main scale 210 and the reading scale 220. The pitch of the second grids 212 and 222 is twice that of the first grids 211 and 221, and the pitch of the third grids 213 and 223 is four times that the pitch of the first grids 211 and 221.

Furthermore, reference numerals 201, 202 and 203 denote light sources; 231, 232 and 233 denote light-receiving elements; 240 denotes an addition circuit; and 250 denotes a discrimination circuit.

The operation performed by this arrangement will now be described.

FIG. 20 is a schematic diagram illustrating the operating principle of a conventional reference position signal generator.

In accordance with relative movements between the main scale 210 and the reading scale 220, the light-receiving element 231 outputs a basic signal having a peak value, as shown in FIG. 20(a), that is consonant with the grid pitch of the first grid 211 and 221. Further, signals shown in (b) and (d) are obtained from the light-receiving elements 232 and 233. (c) shows a signal obtained by adding the outputs of the light-receiving elements 231 and 232, and (e) shows a signal obtained by adding the outputs of the light-receiving elements 231, 232 and 233. The addition of the outputs of the light-receiving elements is performed by the addition circuit 240, and as is apparent from (e), a special peak rises among a plurality of peaks included in the basic signal, and becomes a signal that suppresses the adjacent peaks. The output signal of the addition circuit 240 is transmitted to the discrimination circuit 250, where the origin signal is generated.

As described above, a plurality of grids having different pitches are employed, and the detection signals generated by the individual grids are synthesized to generate the origin signal.

Conventional Example 2

There is another conventional optical encoder that includes an origin detection function, in addition to a three-grid optical system for emitting an incremental signal (see, for example, patent document 2).

FIG. 21 is a perspective view of an encoder according to this conventional example.

A three-grid optical system characteristic is that the system is not affected by gap fluctuation and can obtain an ideal sinusoidal signal.

Referring to the drawing, reference numeral 300 denotes a reflective type main scale, and 310 denotes an index scale.

A fixed optical grid 301, for displacement detection, a fixed optical grid 302, for origin detection, and a reference mark 303 are formed in the reflective type main scale 300, and movable optical grids 331A and 331B, for displacement detection, a movable optical grid 341, for origin detection, and an origin detection window 342 and a reference light detection window 343 are formed in the index scale 310.

Furthermore, reference numerals 311A and 311B denote light sources for displacement detection; 321 denotes a light source for origin detection; 322 denotes a light source for an origin detection window; and 323 denotes a light source for reference light detection. Moreover, reference numerals 411A and 411B denote light-receiving elements for displacement detection; 421 denotes a light-receiving element for origin detection; 422 denotes a light-receiving element for an origin detection window; and 423 denotes a light-receiving element for reference light detection.

The operation performed in this conventional example to generate an origin signal will now be described.

FIG. 22 is a signal waveform diagram showing the generation principle for an origin signal. In this drawing, light emitted by the origin detection light source 321 passes through the movable origin detection optical grid 341 and is reflected by the fixed origin detection optical grid 302, and the reflected light again passes through the movable origin detection optical grid 341 and is detected by the origin phase light-receiving element 421. When the main scale 300 is displaced relative to the index scale 310 in a direction indicated by an arrow C, or in the opposite direction, the light-receiving element 421 generates a first electric origin detection signal Vo1 having a pitch S2, as shown in FIG. 22.

The light emitted by the origin detection window light source 322 passes through the origin detection window 342 and irradiates the reference mark 303. When the main scale 300 is displaced in the direction indicated by the arrow C, or in the opposite direction, the light-receiving element 422 detects light that is reflected by the fixed origin detection optical grid 302 and the reference mark 303, and generates a second electric Vo2 for origin detection, as shown in FIG. 22.

Further, light emitted by the reference light detection light source 323 passes through the reference light detection window 343 and irradiates the fixed, displacement detection optical grid 301, and the reference light detection light-receiving element 423 detects the light reflected therefrom. The light-receiving element 423 generates a first reference voltage Vref1 and a second reference voltage Vref2, as shown in FIG. 20, that are little affected by optical modulation.

Next, the origin signal generation operation will be described.

In consonance with the displacement of the main scale 300, the second electric signal Vo2 is changed, as indicated by Vo21, Vo22 and Vo23 in FIG. 22. Vo21 indicates a voltage at which the light-receiving element 422 is reading an optical signal output only through the optical grid 302; Vo22 indicates a voltage at which the light-receiving element 422 is reading an optical signal output through both the optical grid 302 and the reference mark 303; and Vo23 is a voltage at which the light-receiving element 422 is reading an optical signal from only the reference mark 303.

First, a second comparator (not shown) detects a second intersection P0, where the second electric signal Vo2 becomes equal to the second reference voltage Vref2. Then, a first comparator (not shown) employs the second intersection P0 to detect an intersection at a fixed number (N) position, i.e., a first intersection P3 where the first electric signal Vo1 becomes equal to the first reference voltage Vref1, and an absolute origin identification circuit (not shown) defines the first intersection P3 as the origin position. In this manner, the location of the origin is determined.

Conventional Example 3

Further, although a description relevant to an origin signal is not included, the invention of an optical rotary encoder employing a three-grid optical system is disclosed (see, for example, patent document 3).

FIG. 23 is a perspective view of an optical rotary encoder according to this conventional example.

Referring to this drawing, rotary slits 111 are formed in a rotary disk 110, at equal pitches, and light source slits 133, for displacement detection, and fixed, displacement detection slits 134 and 135 are formed by a fixed scale 160.

The light emitted by a light source 130 passes through the displacement detection light source slit 133 and irradiates the rotary displacement detection slits 111, and the light that is reflected forms a diffracted image on the fixed displacement detection slits 134 and 135.

According to the description of the conventional example, slit patterns are formed so that, along the linear path of light emitted by the light source, the slit pitches of the three slits are equal, or the pitches of the light source slits 133 for displacement detection and the fixed displacement detection slits 134 and 135 are twice that of the slit pitches of the rotary displacement detection slits 111. As a result, a displacement signal is obtained that is resistant to gap fluctuation and has a superior S/N ratio.

Patent Document 1: JP-A-56-14112
Patent Document 2: JP-A-61-212727
Patent Document 3: JP-A-9-133552

DISCLOSURE OF THE INVENTION

Problems to be Solved by the Invention

However, for generation of the origin signal according to the invention of the first conventional example, since the detection outputs provided by a plurality of slits of different grid pitches must be synthesized, an operation circuit for synthesizing these detection outputs is required, and the arrangement of a detection circuit is therefore complicated. In addition, it is difficult for a three-grid optical system to obtain a superior S/N detection signal by providing a common gap setup for different grid pitches. Therefore, using the three-grid optical system is difficult.

Further, according to the invention of the second conventional example, the first electric origin detection signal Vo1 and the second electric origin detection signal Vo2 are employed together, and to determine the position of the origin, an intersection at which the first electric origin detection signal Vo1 equals the first reference voltage Vref1 is identified, based on a reference position that is obtained from the second electric signal Vo2. Therefore, an absolute origin identification circuit is required, as is a complicated circuit arrangement.

In addition, since the second electric origin detection signal Vo2 is not affected by optical modulation using grids, it is difficult to generate a signal that is sharply changed relative to a displacement, and therefore, generation of a high-precision origin signal is difficult.

In addition, according to the invention of the third conventional example, since the origin signal is not provided, origin signal generation means must be separately provided, externally.

While taking these problems into account, one objective of the present invention is to provide an optical encoder that includes high-precision original signal generation means, having a simple arrangement, that can also be applied for a three-grid optical system.

Means for Solving the Problems

In order to resolve the above described problems, the present invention has the following arrangement.

According to a first aspect of the invention, there is provided an optical encoder for detecting a relative rotation angle for two members, including:

a rotary disk provided for one of the two members that rotate relative to each other, and a light source, a fixed scale and a light-receiving element provided for the other of the two members, wherein the rotary disk is provided with rotary origin phase slits that are formed into a pattern of linear slits arranged in parallel at equal pitches, and the fixed scale is provided with fixed origin phase slits that are formed into a pattern of linear slits arranged in parallel at equal pitches.

According to a second aspect of the invention, there is provided the optical encoder according to the first aspect, wherein the fixed origin phase slits are provided with a plurality of types of slit patterns arranged at different locations, in a direction of a long axis of the slits, from the rotation center of the rotary disk.

According to a third aspect of the invention, there is provided the optical encoder according to the first aspect, wherein the rotary origin phase slits are provided with the slit pattern displaced, in a direction of a short axis of the slits, from the rotation center of the rotary disk, and the fixed origin phase slits are provided with the slit pattern displaced, in the direction of the short axis of the slits, from the rotation center.

According to a fourth aspect of the invention, there is provided the optical encoder according to the first aspect, wherein the rotary origin phase slits are provided with the slit pattern displaced, in a direction of a short axis of the slits, from the rotation center of the rotary disk, and the fixed origin phase slits are provided with a plurality of types of the slit patterns that are displaced, in a direction of the short axis of the slits, from the rotation center, and that are located at different positions, in a direction of a long axis of the slits, from the rotation center.

According to a fifth aspect of the invention, there is provided the optical encoder according to the first aspect, wherein the fixed scale is provided with origin phase light source slits that are formed into a pattern of linear slits arranged in parallel and at equal pitches and that are located in a front face of the light source, and the fixed origin phase slits.

According to a sixth aspect of the invention, there is provided the optical encoder according to the fifth aspect, wherein the fixed origin phase slits are provided with a plurality of types of the slit patterns located at different positions, in a direction of a long axis of the slits, from the rotation center of the rotary disk.

According to a seventh aspect of the invention, there is provided the optical encoder according to the fifth aspect, wherein the rotary origin phase slits are provided with the slit pattern displaced, in a direction of a short axis of the slits, from the rotation center of the rotary disk, and the fixed origin phase slits are provided with the slit pattern displaced, in the direction of the short axis of the slits, from the rotation center.

According to an eighth aspect of the invention, there is provided the optical encoder according to the fifth aspect, wherein the rotary origin phase slits are provided with the slit pattern displaced, in a direction of a short axis of the slits, from the rotation center of the rotary disk, and the fixed origin phase slits are provided with a plurality of types of the slit patterns that are displaced from the rotation center in the direction of the short axis of the slits, and that are located at different positions, in a direction of a long axis of the slits, from the rotation center.

According to a ninth aspect of the invention, there is provided an optical encoder for detecting a relative rotation angle for two members, including:

a rotary disk provided for one of the two members that rotate relative to each other, and a light source, a fixed scale and a light-receiving element provided for the other of the two members, wherein the rotary disk is provided with rotary origin phase slits formed into a pattern of slits radially arranged at equal pitches, of which a circular arc center is located at a position differing from a rotation center of the two members that rotate relative to each other, and the fixed scale is provided with fixed origin phase slits that are formed into a pattern of slits radially arranged at equal pitches.

According to a tenth aspect of the invention, there is provided the optical encoder according to the ninth aspect, wherein the fixed scale is provided with origin phase light source slits that are formed into a pattern of radially arranged slits and that are located in front of the light source, and the fixed origin phase slits.

Advantages of the Invention

According to the invention described in the first aspect, since only one pattern type, for which linear slits are arranged at equal pitches, is required for both the rotary origin phase slits and the fixed origin phase slits, the pattern arrangement is simple. In addition, since only one signal obtained through the rotary origin phase slits and the fixed origin phase slits need be processed, the structure of a detection circuit is also simplified.

According to the invention described in the fifth or tenth aspect, since origin detection using a three-grid optical system is enabled, a large gap is available between the rotary disk and the fixed scale, and it is possible for an encoder to provide an origin signal that is not affected by gap fluctuation.

According to the invention described in the ninth aspect, since only one pattern type, where slits are radially arranged at equal pitches, is required for the rotary origin phase slits and the fixed origin phase slits, the pattern arrangement is simple. In addition, since only one signal obtained through the rotary origin phase slits and the fixed origin phase slits need be processed, the structure of a detection circuit is also simplified.

DESCRIPTION OF REFERENCE NUMERALS AND SIGNS

Figure 1:
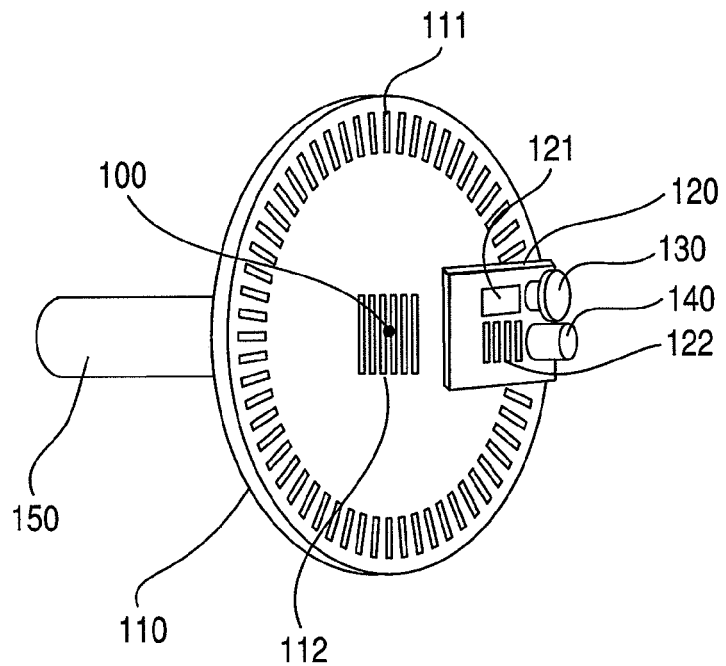
FIG. 1 is a perspective view of an encoder according to a first embodiment of the present invention.

100: rotation center
110: rotary disk
111: rotary displacement detection slit
112: rotary origin phase slit
120, 160: fixed scale
121: ejection window
122 to 124: fixed origin phase slit
125, 126, 134, 135: fixed displacement detection slit
130: light source
132: origin phase light source slit
133: displacement detection light source slit
140, 141, 142: origin phase light-receiving element
143, 144: displacement detection light-receiving element
150: rotary shaft
170: image
250: hub

BEST MODES FOR CARRYING OUT THE INVENTION

The embodiments of the present invention will now be described while referring to drawings.

Embodiment 1

FIG. 1 is a perspective view of an encoder according to a first embodiment of the present invention.

Referring to the drawing, reference numeral 110 denotes a rotary disk; 120 denotes a fixed scale; 130 denotes a light source; 140 denotes an origin phase light-receiving element; and 150 denotes a rotary shaft. And rotary displacement detection slits 111 and rotary origin phase slits 112 are formed in the rotary disk 110, while an ejection window 121 and fixed origin phase slits 122 are formed in the fixed scale 120. The rotary origin phase slits 112 are formed into a pattern of linear slits that are arranged in parallel, and the fixed origin phase slits 122 are likewise formed into a pattern of linear slits that are arranged in parallel.

Since the structure of a displacement detection portion is well known, no explanation for this will be given.

Figure 2:
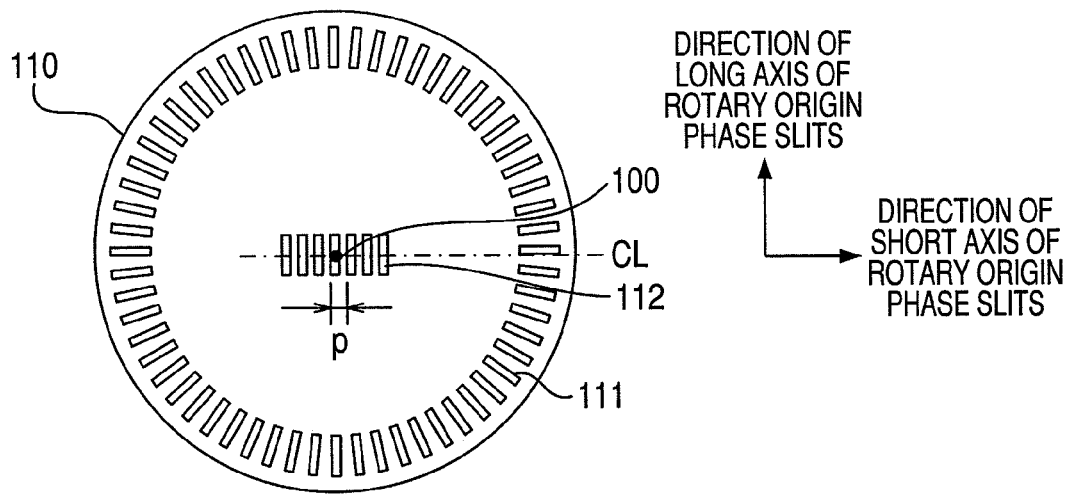
FIG. 2 is a slit pattern diagram illustrating the arrangement of rotary origin phase slits according to the first embodiment of the present invention.

FIG. 2 is a slit pattern diagram, for the rotary disk 110, showing the arrangement of the rotary origin phase slits for this embodiment. As illustrated in the drawing, the rotary origin phase slits 112 are arranged so that a center CL, in the direction of the long axis of the slits, passes through a rotation center 100. The rotary origin phase slits 112 are formed into a slit pattern having a slit pitch P.

Next, the operation will be described.

Figure 3:
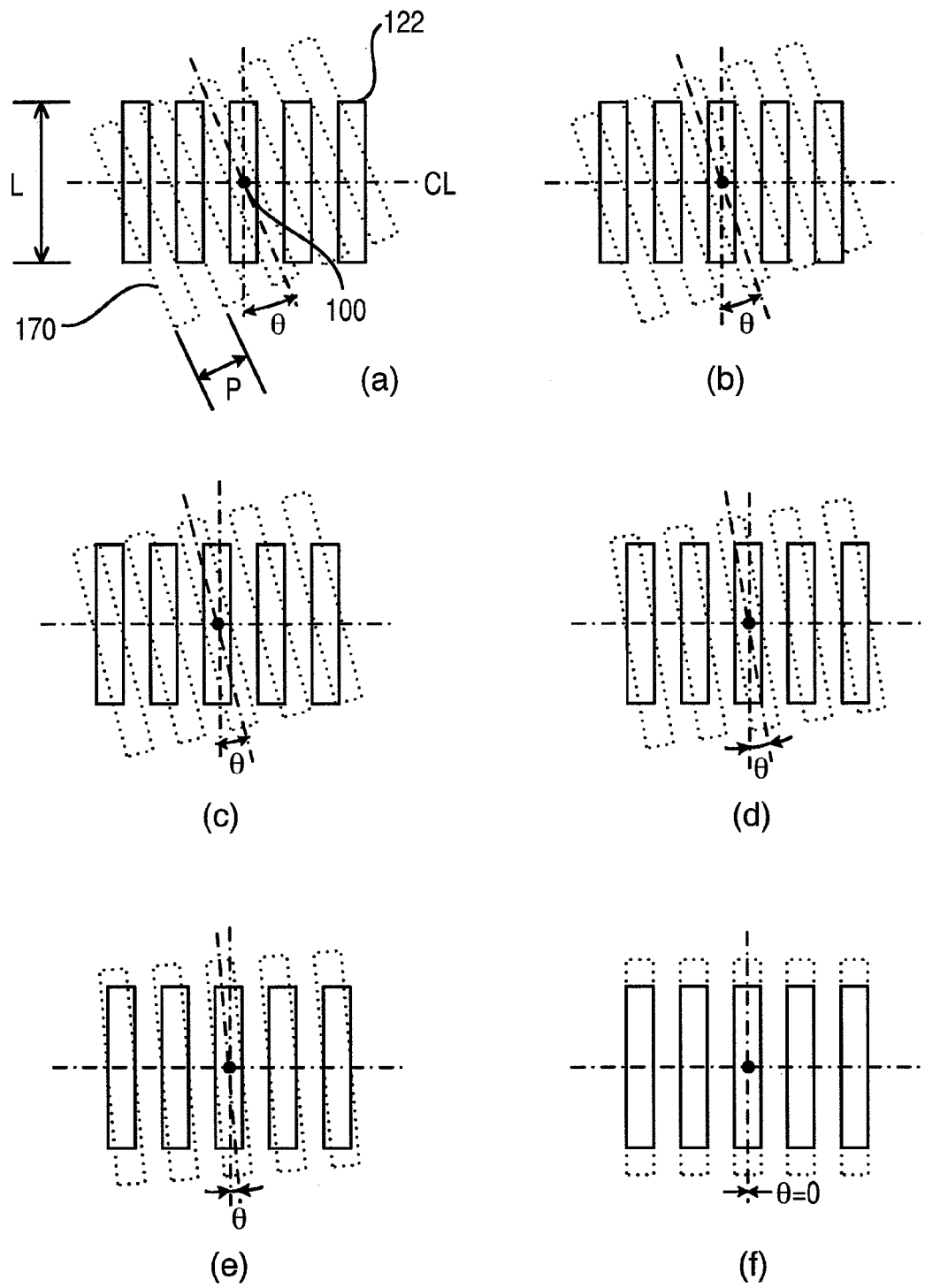
FIG. 3 is a schematic diagram illustrating the positional relationship for the first embodiment of the present invention between an image, obtained using the rotary origin phase slits, and fixed origin phase slits.

FIG. 3 is a schematic diagram illustrating the positional relationship, when the rotary disk is rotated, between an image, formed using the rotary origin phase slits, and the fixed origin phase slits. Reference numeral 170 denotes an image that an irradiation light from the light source 130 is reflected at the rotary origin phase slits 112 and is formed on the fixed origin phase slits 122. At pitches P, the images are formed at the fixed origin phase slits 122. Portions inside broken lines indicate bright portions, and other portions indicate dark portions. Further, L denotes the slit length in the direction of the long axis of the fixed origin phase slits.

FIG. 3(a) shows a case wherein an angle $\theta$ (a rotation angle $\theta$) formed by the image 170 and the fixed origin phase slits 122 is greater than $\tan^{-1}(P/L)$. Within this range, the image 170 crosses multiple fixed origin phase slits 122, and the bright portion and the dark portion of the image 170 almost equally overlap the openings of the fixed origin phase slits 122. Therefore, the amount of light that passes through the fixed origin phase slits 122 indicates almost half the maximum value.

When $\theta$ approaches 0 by being changed from the state (a) to (b)→(c)→(d)→(e)→(f), the area where the openings of the fixed origin phase slits 122 overlap the bright portion of the image 170 is increased, and the amount of light that passes through the fixed origin phase slits 122 is gradually increased. And in the state where $\theta=0$, in FIG. 3(f), only the bright portion of the image 170 overlaps the openings of the fixed origin phase slits 122, and the amount of light that passes through the fixed origin phase slits 122 reaches the maximum.

Figure 4:
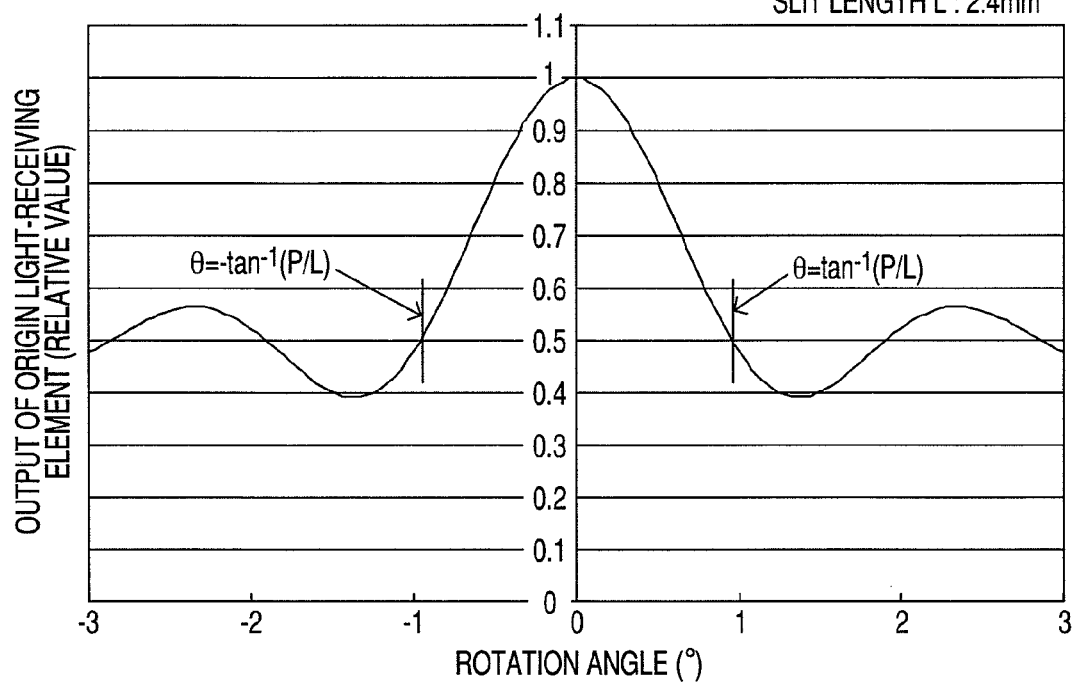
FIG. 4 is a graph showing the relationship between the rotation angle of the rotary origin phase slits and the output of an origin phase light-receiving element according to the first embodiment of the present invention.

FIG. 4 is a graph showing the relationship between the rotation angle of the rotary origin phase slits and the output of the origin phase light-receiving element.

In this embodiment, P=40 µm and L=2.4 mm are employed. It should be noted that the output of the origin phase light-receiving element along the vertical axis represents a value obtained by normalizing the maximum value as "1".

As is apparent from the drawing, the output is substantially 0.5 when $\theta=\pm\tan^{-1}(P/L)=$about $\pm 1°$, and rises sharply when the rotation angle is near $\theta=0$. Therefore, when the output of the origin phase light-receiving element is converted into a voltage signal by a current-voltage conversion circuit (not shown), and a point of 0.8 or higher than the element output is detected by a signal processor, such as a comparator, an origin signal having a width of almost $\pm 0.5°$ can be obtained.

Embodiment 2

Figure 5:
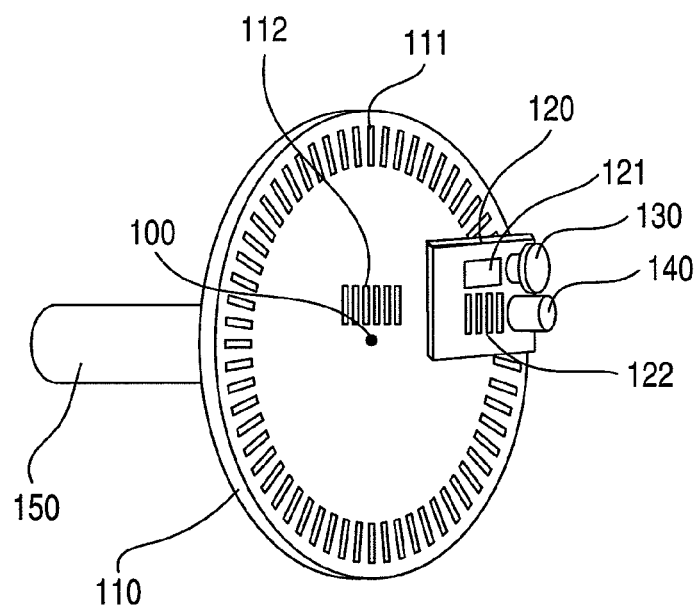
FIG. 5 is a perspective view of an encoder according to a second embodiment of the present invention.
Figure 6:
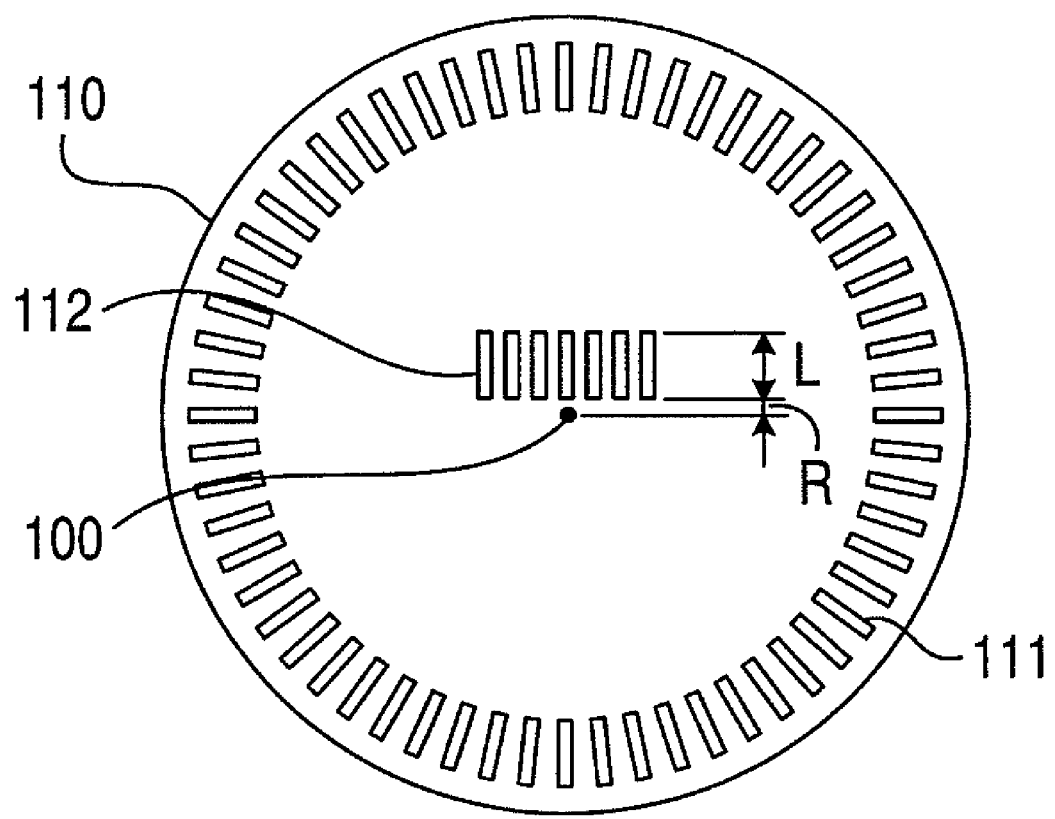
FIG. 6 is a slit pattern diagram illustrating the arrangement of rotary origin phase slits according to the second embodiment of the present invention.

FIG. 5 is a perspective view of an encoder for a second embodiment of the present invention. FIG. 6 is a slit pattern diagram illustrating the arrangement of rotary origin phase slits according to this embodiment. R indicates a distance from a rotation center 100 to the end of a rotary origin phase slit 112 in the direction of the long axis of the slits.

A difference in this embodiment from the first embodiment is that the rotary origin phase slits 112 are shifted away from the rotation center 100 in the direction of the long axis of the slits. As illustrated in FIG. 5, a fixed scale 120, a light source 130 and an origin phase light-receiving element are also arranged by being shifted in the same manner.

The operation performed for this embodiment will now be described.

Figure 7:
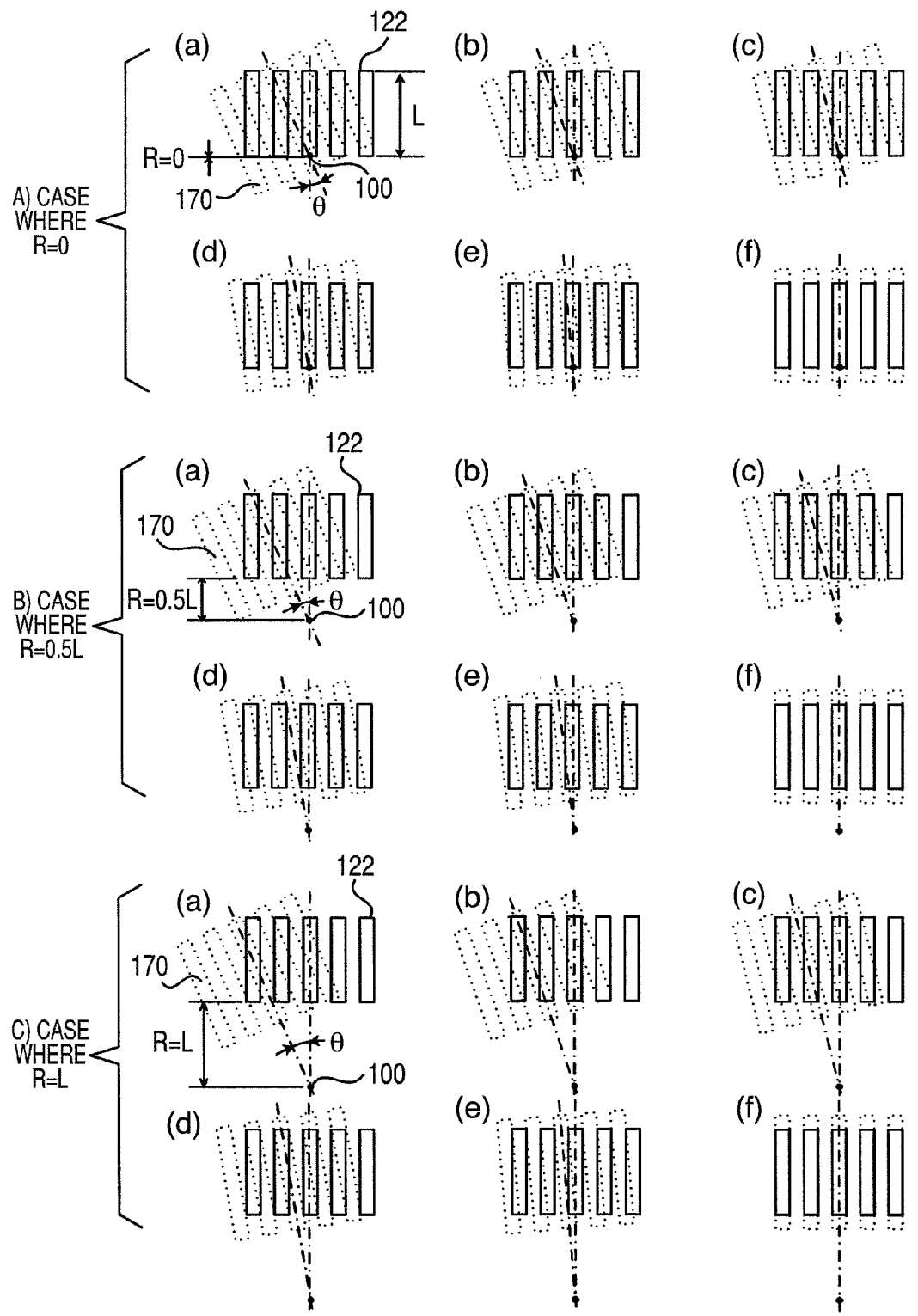
FIG. 7 is a schematic diagram illustrating the positional relationship for the second embodiment of the present invention between an image, obtained using the rotary origin phase slits, and fixed origin phase slits.

FIG. 7 is a schematic diagram illustrating the relationship in this embodiment between the position of an image, formed by the rotary origin phase slits, and the position of the fixed origin phase slits when the rotary disk is rotated. A) is a case where R=0, B) is a case where R=0.5L and C) is a case where R=L.

Referring to FIG. 7, in all the cases A), B) and C), an angle (a rotation angle $\theta$) formed by an image 170 and fixed origin phase slits 122 is $\theta<-\tan^{-1}(P/L)$ or $\theta>\tan^{-1}(P/L)$. Within this range, the image 170 crosses multiple fixed origin phase slits 122, and when the image 170 passes the openings of the fixed origin phase slits 122, the bright portion and the dark portion of the image 170 have equal proportions, as in the first embodiment. However, unlike in the first embodiment, part of the fixed origin phase slits 122 is shifted away from the image 170. Accordingly, the amount of light that passes through the fixed origin phase slits 122 is reduced. And when the rotation angle θ becomes greater, and the image 170 is shifted away from the fixed origin phase slits 122, the output of the origin phase light-receiving element is near 0.

In case A) in FIG. 7, in a state (b), where θ=±tan$^{-1}$(P/L), the bright portion and the dark portion of the image 170 overlap, in equal proportions, the openings of the fixed origin phase slits 122, and therefore, the output of the origin phase light-receiving element is 0.5. Near θ=±tan$^{-1}$(3P/4L) in a state (c), more of the dark portion of the image 170 overlaps the openings of the fixed origin phase slits 122, and the output of the origin phase light-receiving element is reduced below 0.5. When the value of θ approaches 0 and a state (d), where θ=±tan$^{-1}$(P/2L), is established, the bright portion and the dark portion of the image 170 overlap, in the equal proportions, the openings of the fixed origin phase slits 122. Thus, the output of the origin phase light-receiving element becomes 0.5. Thereafter, when the value of θ approaches 0, as shown for states (e)→(f), simply the ratio at which the bright portion of the image 170 overlaps the openings of the fixed origin phase slits 122 is increased. Therefore, the amount of light is gradually increased, and when in the state (f) θ=0, the output of the origin phase light-receiving element reaches a maximum of "1".

In the case B), as well as in the case of A), in the state (b), where θ=±tan$^{-1}$(P/L), the bright portion and the dark portion of the image 170 overlap, in equal proportions, the openings of the fixed origin phase slits 122. Thus, the output of the origin phase light-receiving element is 0.5. In this state, the bright portion of the image 170 passes through the slit adjacent to the slit that the image should pass through. When the value of θ approaches 0, as shown in the states (b)→(c)→(d)→(e)→(f), the image 170 is rotated and is shifted in the direction of the short axis of the fixed origin phase slits 122, and the bright portion begins to overlap the slits in the state where θ=0. In the state (c), the bright portion and the dark portion of the image 170 overlap, in equal proportions, the openings of the fixed origin phase slits 122, and the output of the origin phase light-receiving element is 0.5. In the state (d), where θ=±tan$^{-1}$(P/2L), a larger proportion of the dark portion of the image 170 overlaps the openings of the fixed origin phase slits 122, so that the output of the origin phase light-receiving element is reduced to below 0.5. In the state (e), the bright portion and the dark portion of the image again overlap, in equal proportions, the openings of the fixed origin phase slits 122, and the output of the origin phase light-receiving element becomes 0.5. Thereafter, the overlapping of the bright portion of the image 170 by the openings of the fixed origin phase slits 122 is simply increased, and the output of the origin phase light-receiving element approaches the maximum value of 1. In the state (f), where θ=0, the output of the origin phase light-receiving element reaches the maximum value of 1.

In the case C), as well as in A) and B), in the state (b), where θ=±tan$^{-1}$(P/L), the bright portion and the dark portion of the image 170 overlap, in equal proportions, the openings of the fixed origin phase slits 122, and the output of the origin phase light-receiving element is 0.5. In this state, the bright portion of the image 170 passes through the slits at the first and the second locations from a slit in the state where θ=0. When the value of θ approaches 0 as shown in (b)→(c)→(d)→(e)→(f), the image 170 is rotated, and is also moved parallel to the direction of the short axis of fixed origin phase slits 122, and the bright portion begins to overlap the slit in the state where θ=0. In the state (c), a little greater proportion of the bright portion of the image 170 overlaps the openings of the fixed origin phase slits 122, and the output of the origin phase light-receiving element becomes a little higher than 0.5. In the state (d), where θ=±tan$^{-1}$(P/2L), the bright portion and the dark portion of the image 170 again overlap, in equal proportions, the openings of the fixed origin phase slits 122, and the output of the origin phase light-receiving element becomes 0.5. In the state (e), since a larger proportion of the dark portion of the image 170 overlaps the openings of the fixed origin phase slits 122, the output of the origin phase light-receiving element is lower than 0.5. Thereafter, since simply the bright portion of the image 170 overlaps the openings of the fixed origin phase slits 122, the amount of light passing through the fixed origin phase slits 122 is increased, and the output of the origin phase light-receiving element approaches the maximum value of 1. In the state (f), where θ=0, the output of the origin phase light-receiving element reaches the maximum value of 1.

Figure 8:
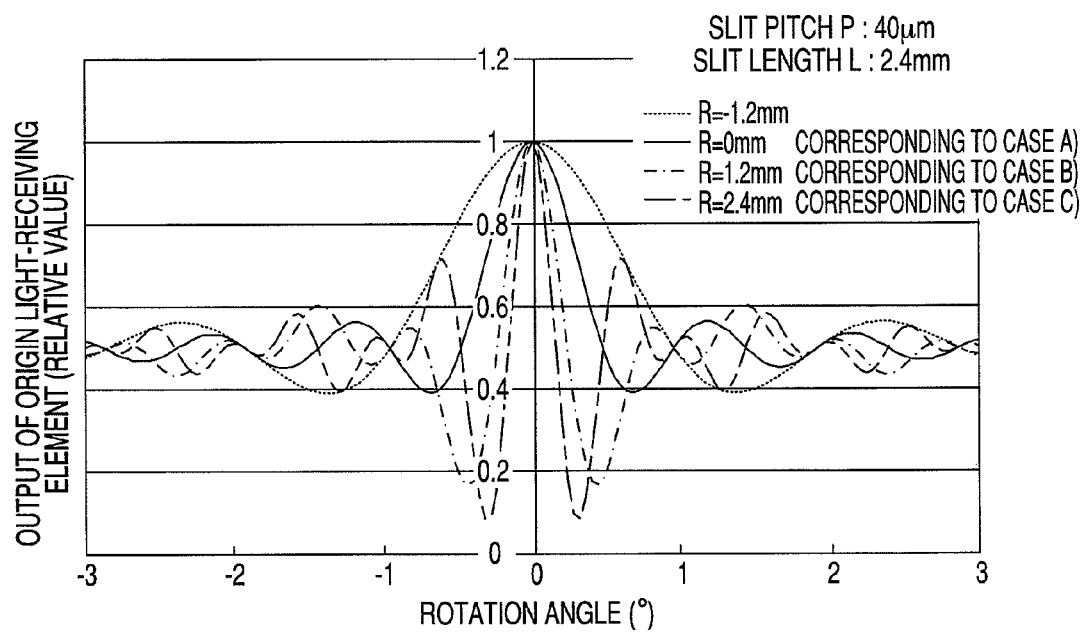
FIG. 8 is a graph showing the relationship between the rotation angle of the rotary origin phase slits and the output of an origin phase light-receiving element according to the second embodiment of the present invention.

FIG. 8 is a graph showing the relationship between the rotation angle θ and the output of the origin phase light-receiving element, i.e., showing the relationship between the rotation angle θ and the output of the origin phase light-receiving element when the relationship between the image and the fixed origin phase slits 122 is changed, as shown in FIG. 7, in consonance with the rotation angle θ.

In accordance with the distance R between the center of the rotary origin phase slits 112 and the rotation center 100, the output of the origin phase light-receiving element 140 is changed as shown in FIG. 8. That is, when the distance R between the rotary origin phase slits 112 and the rotation center 100 is increased, a larger output signal is generated in the sidebands to the right and left of the pulse output in the state where θ=0. And the pulse output in the state where θ=0 is a steeper signal. R=0 mm corresponds to the case A) in FIG. 7, R=1.2 mm corresponds to the case B) in FIG. 7, and R=2.40 mm corresponds to the case C) in FIG. 7.

Assuming that R=1.2 mm is set when, for example, P=40 μm and L=2.4 mm, it is found that the pulse output in the state where θ=0 is steeper than the waveform of the output signal obtained when R=−1.2 mm, which corresponds to the first embodiment, and that the magnitude of fluctuations of an output signal formed on both sides is considerably smaller than that of an output signal having a pulse shape. For example, when a level of 0.8, of the output of the origin phase light-receiving element along the vertical axis, is employed as a threshold value, an origin signal having a width of ±0.25° can be detected using a comparator.

As described above, according to this embodiment, since the rotary origin phase slits are shifted, in the direction of the long axis of the slits, away from the rotation center, a sharp pulse output can be obtained, and therefore, a high-precision origin signal can be obtained. Further, in the first embodiment, since the centers of the rotary origin phase slits 112 and the fixed origin phase slits 122 are located on the rotation center 100, the pulse output signal is also generated at the location where the rotary disk is turned 180 degrees, and a signal of two pulses is generated for one rotation. On the other hand, in this embodiment, since the rotary origin phase slits 112 are formed by being shifted away from the rotation center 100, the output signal does not occur at the position at which the rotary disk has been turned 180 degrees, and an origin signal of one pulse for one rotation can be obtained.

Embodiment 3

Figure 9:
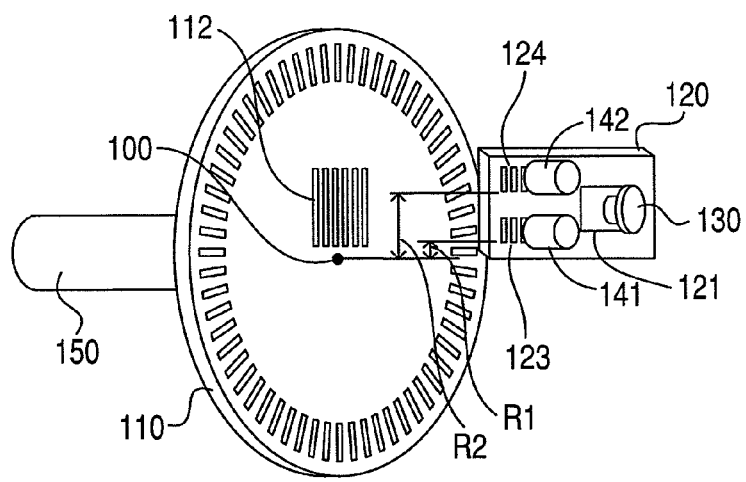
FIG. 9 is a perspective view of an encoder for a third embodiment of the present invention.

FIG. 9 is a perspective view of an encoder for a third embodiment of the present invention.

While referring to the drawing, reference numeral 123 denotes a first fixed origin phase slit, and 124 denotes a second fixed origin phase slit. A difference in this embodiment from the second embodiment is that two types of fixed origin phase slits are formed in a fixed scale 120, and are arranged at different positions along the direction of the long axis. The first fixed origin phase slits 123 and the second fixed origin phase slits 124 are located so that distances R1 and R2 are respectively obtained between their ends in the directions of the long axes and a rotation center 100.

Next, the operation performed for this embodiment will be described.

As described in the second embodiment, the waveform of the output of the origin phase light-receiving element is changed in accordance with the distance R between the ends of the fixed origin phase slits in the direction of the long axis and the rotation center. By using this phenomenon, the output of the origin phase light-receiving element is obtained from multiple fixed origin phase slits, for which the distance R is different, and is additionally employed. As a result, a sharp pulse output can be obtained in the state where θ=0, and the pulse output generated near θ=0 can be suppressed.

Figure 10:
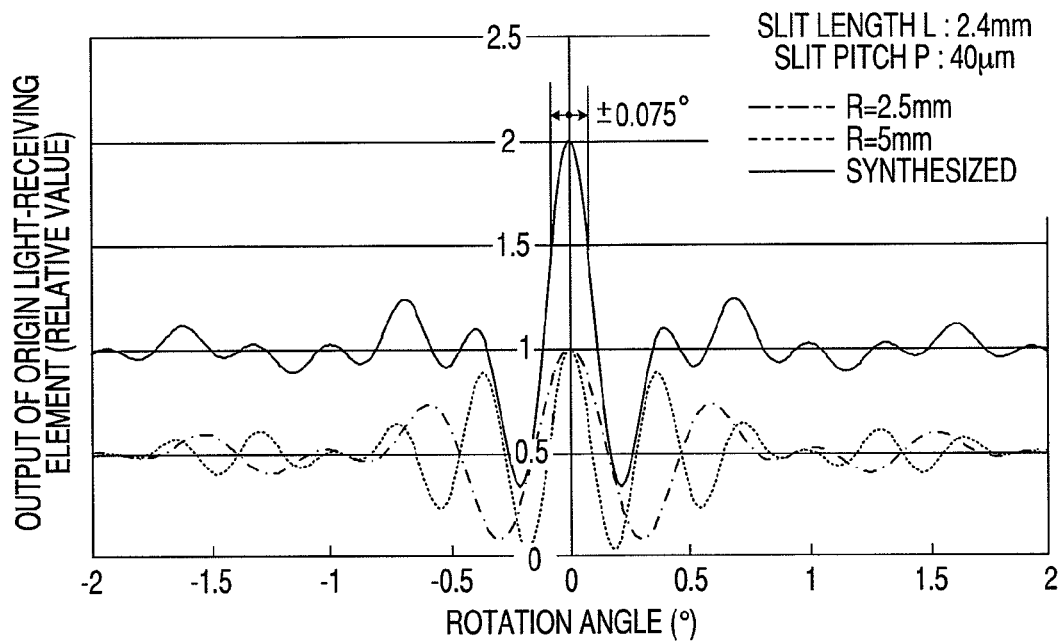
FIG. 10 is a graph showing the relationship between the rotation angle of rotary origin phase slits and the output of an origin phase light-receiving element according to the third embodiment of the present invention.

FIG. 10 is a graph showing the relationship between the rotation angle and the output of the origin phase light-receiving element according to this embodiment. In this embodiment, the first fixed origin phase slits 123 and the second fixed origin phase slits 124, for which P=40 μm and L=2.4 mm, are respectively located at the distances R1=2.5 mm and R2=5 mm. And the output signal obtained from the origin light-receiving elements that correspond to the fixed origin phase slits are added together to synthesize a signal. As for the output signal of the origin phase light-receiving element that passed through the second fixed origin phase slits 124, a large sideband signal occurs near ±0.4°; however, this signal is synthesized by being canceled using the output signal of the origin phase light-receiving element that passed through the first fixed origin phase slits 123. As a result, when, for example, a level of 1.5 for the output of the origin phase light-receiving element is employed as a threshold value, an origin signal having a width of ±0.075° can be obtained using a comparator.

As described above, by appropriately employing fixed origin phase slits that are located at different distances between the ends in the direction of the long axis and the rotation center 100, a pulse waveform can be obtained that is near 0°, with a small and sharp sideband wave. Thus, a high-resolution origin signal can be obtained.

In this embodiment, R1 and R2 are provided at a ratio of 1:2; however, there is another appropriate ratio. Also in this embodiment, two types of fixed origin phase slits are formed at different positions along the direction of the long axis of the slits; however, three or more types of fixed origin phase slits can also be employed.

Embodiment 4

Figure 11:
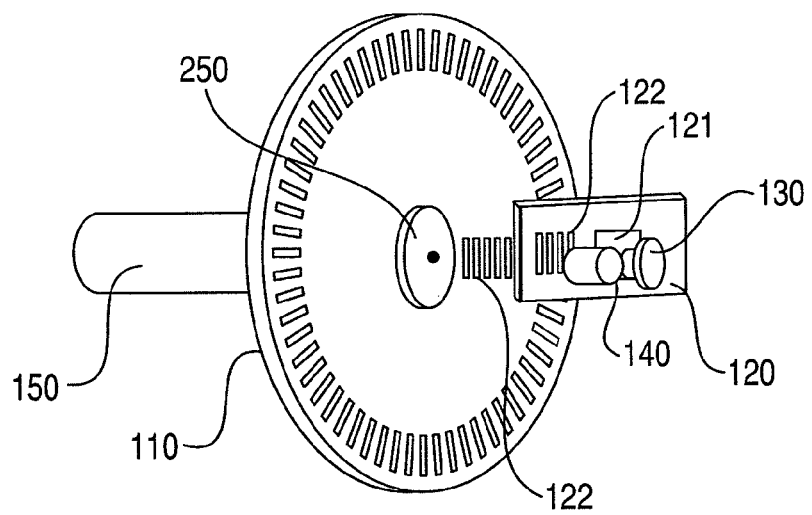
FIG. 11 is a perspective view of an encoder for a fourth embodiment of the present invention.

FIG. 11 is a perspective view of an encoder for a fourth embodiment of the present invention.

A difference in this embodiment from the first embodiment is that rotary origin phase slits 112 are arranged by being shifted from a rotation center 100 in the direction of the short axis of the slits. While referring to the drawing, reference numeral 250 denotes a hub that is extended from a shaft 150 and passes through the center portion of a rotary disk 110, and that is employed for fixing the rotary disk 110.

Figure 12:
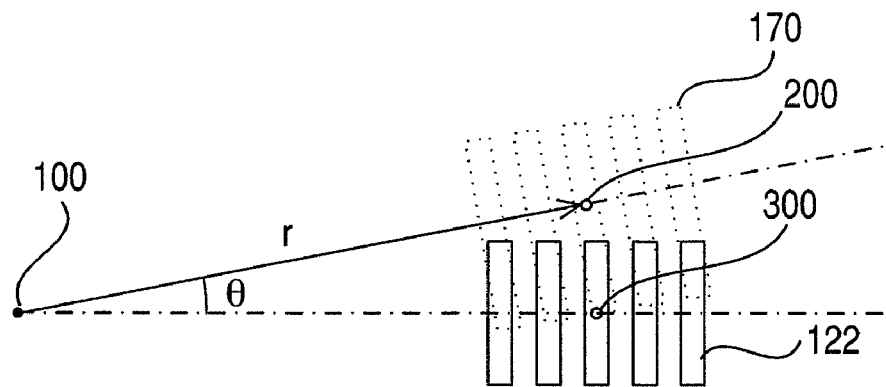
FIG. 12 is a schematic diagram illustrating the positional relationship for the fourth embodiment of the present invention between an image, obtained using rotary origin phase slits, and fixed origin phase slits.

FIG. 12 shows the relationship between an image 170 and fixed origin phase slits 122 established when the rotary disk 110 is positioned by being turned from the origin position to an angle θ. In this case, reference numeral 300 denotes a center of the fixed origin phase slits 122, and 200 denotes a center of the image 170 that is obtained using the rotary origin phase slits 112. At the origin position, the center of the image 170 overlaps the center 300 of the fixed origin phase slits 122. Value r defines the distance from the rotation center 100 to the center 200 of the image 170.

It is understood that the image 170 rotates at the center 200 to θ, and that the center 200 of the image is shifted parallel, from the center 300 of the fixed origin phase slits 122, distances equivalent to r−r·cos θ and r·sin θ in the X and Y directions in the drawing. Therefore, the signal output by the origin phase light-receiving element is affected by the difference between the image 170 and the fixed origin phase slits 122 that is the result of the rotation, and the difference between the image 170 and the fixed origin phase slits 122 that is the result of the parallel movement.

The affect produced by rotation is the same as that shown in FIG. 3 for the first embodiment. In a case wherein the angle θ formed by the image 170 and the fixed origin phase slits 122 is greater than $\tan^{-1}(P/L)$, the image 170 crosses multiple fixed origin phase slits 122, and the bright portion and the dark portion of the image 170 overlap, in equal proportions, the openings of the fixed origin phase slits 122, and the output of the origin phase light-receiving element becomes substantially half the maximum value. Therefore, in this case, even when the output of the origin phase light-receiving element is affected by the parallel movement, the output does not exceed a value nearly half the maximum value. In addition, as θ is increased, the image 170 is shifted away from the fixed origin phase slits 122, and the output of the origin phase light-receiving element approaches 0.

As for the affect provided by the parallel movement in a case wherein θ is smaller than $\tan^{-1}(P/L)$, displacement r−r·cos θ in the X direction is very small because the value of θ is small. Further, since the fixed origin phase slits 122 are formed so sufficiently longer in the direction of the long axis than in the direction of the short axis, the displacement r·sin θ in the Y direction is also small and may be ignored. For example, in a case where P=40 μm, L=2.4 mm and r=10 mm, an X-directional displacement of 1.4 μm and a Y directional displacement of 0.17 mm are obtained when θ=$\tan^{-1}(P/L)$=0.95°, and these values are very small and may be ignored. Therefore, in this range, the output of the origin phase light-receiving element is affected only by rotation.

As described above, since the rotary origin phase slits 120 are displaced from the rotation center, along the direction of the short axis of the rotary origin phase slits 120, a hub 250 to be used for fixing the rotary disk 110 can be located at the center of the rotary disk 110.

Figure 13:
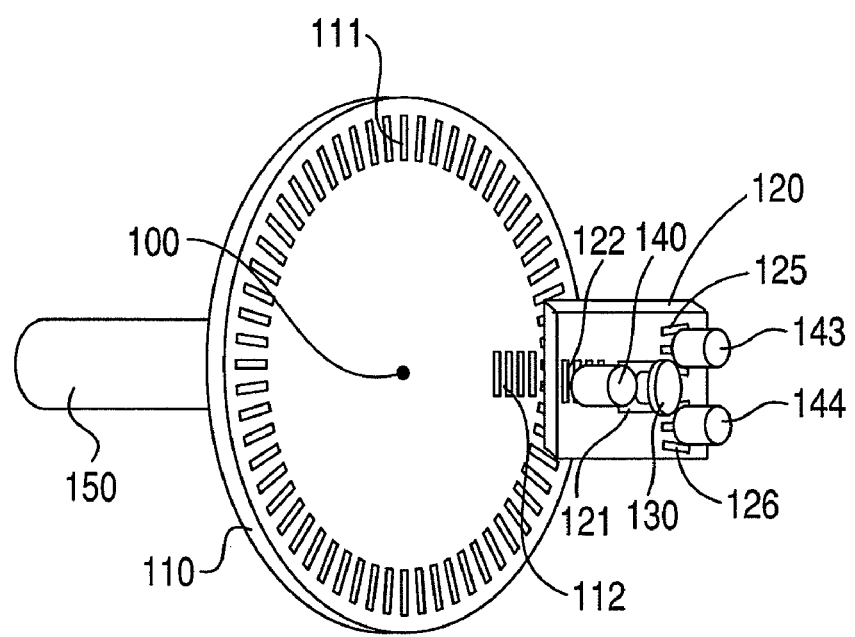
FIG. 13 is a perspective view of the encoder showing other effects obtained for the fourth embodiment of the present invention.

FIG. 13 is a perspective view of the encoder for explaining the other effects obtained in this embodiment.

While referring to the drawing, reference numeral 112 denotes a rotary origin phase slit, which is formed in the vicinity of the rotary displacement detection slit 111, that is being displaced, from the rotation center 100, in the direction of the short axis of the slits. Further, reference numeral 122 denotes a fixed origin phase slit, and 125 and 126 denote fixed, displacement detection slits that are formed in one fixed scale 120. In addition, reference numeral 130 denotes a light source that irradiates the rotary displacement detection slits 111 and the rotary origin phase slits 112.

The operation will now be described.

Light emitted by the light source 130 passes through an ejection window 121 and irradiates the rotary displacement detection slits 111 and the rotary origin phase slits 112. When the light is reflected at the rotary displacement detection slits 111, the reflected light passes through the fixed displacement detection slits 125 or 126, and is detected, by a light-receiving element 143 or 144, and converted into a displacement signal by a signal processing circuit (not shown). Likewise, the light reflected at the rotary origin phase slits 112 passes through the fixed origin phase slits 122 and is detected by the origin phase light-receiving element 140.

As described above, in this embodiment, since the rotary origin phase slits are shifted, from the rotary center, in the direction of the short axis of the slits, these rotary origin phase slits can be arranged near the rotary displacement detection slits. Therefore, since the fixed displacement detection slits and the fixed origin phase slits can be formed closely together in one fixed scale, the structure can be simplified. In addition, the two types of slits can be irradiated by one light source. That is, a small detection section, which includes the light-emitting element, the light-receiving elements and the fixed scale, can be provided.

Embodiment 5

Figure 14:
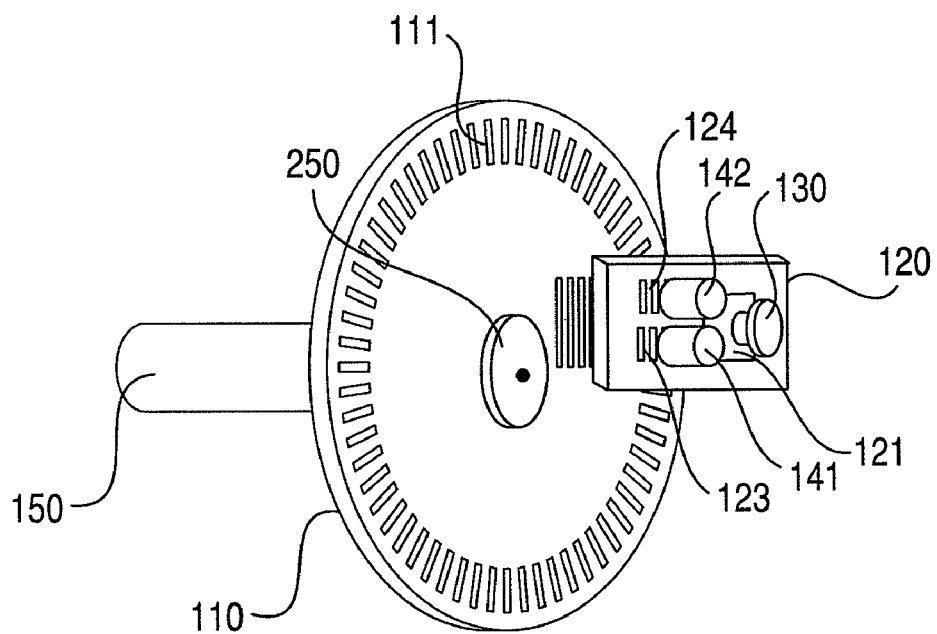
FIG. 14 is a perspective view of an encoder for a fifth embodiment of the present invention.

FIG. 14 is a perspective view of an encoder for a fifth embodiment of the present invention.

While referring to FIG. 14, reference numeral 123 denotes a first fixed origin phase slit and 124 denotes a second fixed origin phase slit. These slits are formed so that they are shifted, from the rotation center, in the direction of the short axis of the slits, and are located at different positions along the direction of the long axis of fixed origin phase slits. A difference in this invention from the fourth embodiment is that the first fixed origin phase slits 123 and the second fixed origin phase slits 124 are arranged at different positions along the direction of the long axis of the fixed origin phase slits.

As described above, in this embodiment, the rotary origin phase slits are arranged so that they are shifted, from a rotation center 100, in the direction of the short axis of the fixed origin phase slits. Further, the first fixed origin phase slits 123 and the second fixed origin phase slits 124 are formed at different positions along the direction of the long axis. Thus, a hub 250 used for fixing a rotary disk 110 can be attached at the center of the rotary disk 110. Moreover, when signals detected using the two types of fixed slits are synthesized, a sharp pulse waveform having a small sideband wave can be obtained. Therefore, a high-resolution origin signal can be obtained.

Further, with the arrangement of this embodiment, the rotary origin phase slits can be arranged near the rotary displacement detection slits, and the fixed displacement detection slits and the fixed origin phase slits can be formed near each other in one fixed scale. Therefore, the structure can be simplified. And in addition, both slits can also be irradiated by a single light source, and the size of a detection section that includes a light-emitting element, a light-receiving element and a fixed scale can be reduced.

Embodiment 6

Figure 15:
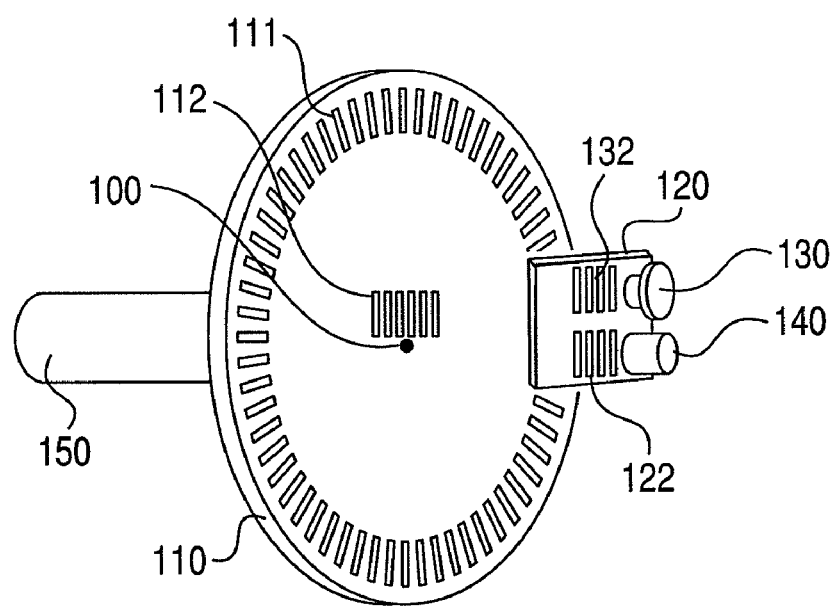
FIG. 15 is a perspective view of an encoder for a sixth embodiment of the present invention.

FIG. 15 is a perspective view of an encoder for a sixth embodiment of the present invention.

While referring to the drawing, reference numeral 132 denotes an origin phase light source slit that converts, into a linear light source array, light emitted by a light source 130. A difference of this invention from the second embodiment is that the origin phase light source slits 132 and fixed origin phase slits 122 are formed in a fixed scale 120.

Light emitted by the light source 130 passes through the origin phase light source slits 132 and irradiates the rotary origin phase slits 112. The light reflected at the rotary origin phase slits 112 forms interference fringes on the fixed origin phase slits 122. A light-receiving element 140 detects the interference fringes through the fixed origin phase slits 122. In this manner, origin detection can be performed by a three-grid optical system, which employs origin phase light source slits, rotary origin phase slits and fixed origin phase slits.

When the rotary disk of this embodiment is rotated, the positional relationship of an image, formed through the rotary origin slits and the fixed origin phase slits, is the same as in the second embodiment, and a sharp origin signal, as in the second embodiment, is obtained. Furthermore, since the three-grid optical system is employed as an optical system, the origin detection signal is stably obtained, even when the gap between the rotary disk 110 and the fixed scale 120 is changed.

In addition, since a displacement detection section (not shown) is provided using a three-grid optical system, an encoder, wherein the displacement detection section and the origin detection section are little affected by gap fluctuation, can be provided.

It should be noted that the origin phase light source slits, the rotary origin phase slits and the fixed origin phase slits may be formed at a ratio of pitches of either 1:1:1, or 2:1:2.

Embodiment 7

Figure 16:
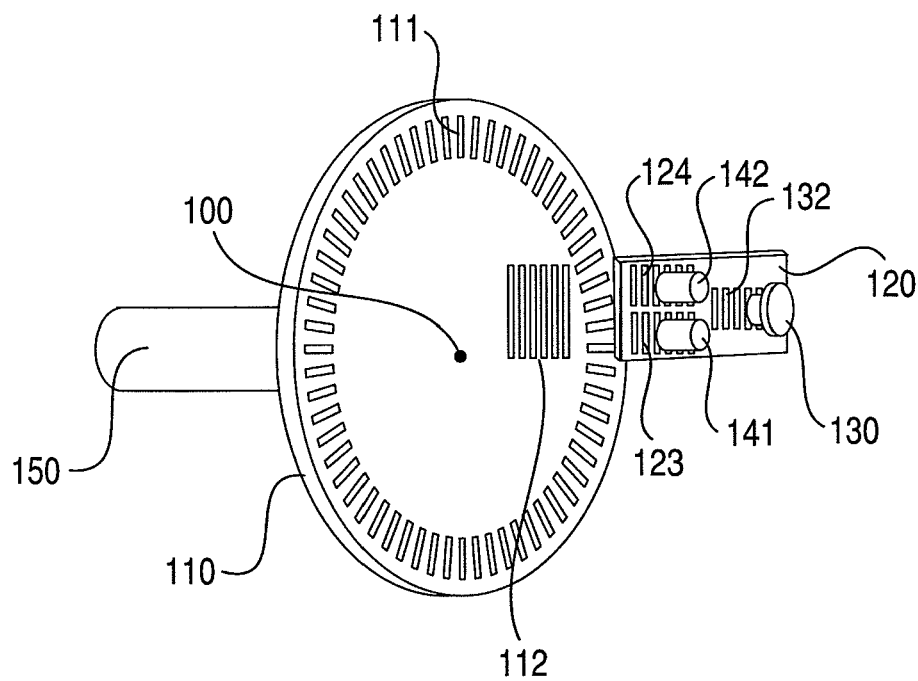
FIG. 16 is a perspective view of an encoder for a seventh embodiment of the present invention.

FIG. 16 is a perspective view of an encoder for a seventh embodiment of the present invention.

While referring to the drawing, reference numeral 123 denotes a first fixed origin phase slit and 124 denotes a second fixed origin phase slit. These slits are formed so that the slits are shifted, from the rotation center, in the direction of the short axis of the slits, and are arranged at different positions along the direction of the long axis of the fixed origin phase slits. A difference of this invention from the sixth embodiment is that the first fixed origin phase slits 123 and the second fixed origin phase slits 124 are arranged at different positions along the direction of the long axis of the fixed origin phase slits.

Next, the operation will be described.

Light emitted by a light source 130 passes through origin phase light source slit 132 and irradiates rotary origin phase slits 112. When the light is reflected at the rotary origin phase slits 112, the reflected light forms interference fringes on the first fixed origin phase slits 123 and the second fixed origin phase slits 124. Light-receiving elements 141 and 142 detect the interference fringes through the first fixed origin phase slits 123 and the second fixed origin phase slits 124. In this manner, origin detection can be performed by a three-grid optical system employing origin phase light source slits, rotary origin phase slits and fixed origin phase slits.

Since the three-grid optical system is employed as an optical system, an origin detection signal can be stably obtained, as in the sixth embodiment, even when a gap between a rotary disk 110 and a fixed scale 120 is changed. Further, in this embodiment, when signals detected using the two types of fixed slits are synthesized, a sharp pulse waveform with a small sideband wave can be obtained. Therefore, a high-resolution origin signal can be obtained. It should be noted that when a displacement detection section (not shown) is provided using a three-grid optical system, an encoder wherein the displacement detection section and the origin detection section are little affected by gap fluctuation can be provided, as in the sixth embodiment. The origin phase light source slits, the rotary origin phase slits and the fixed origin phase slits may be formed at a ratio of pitches of either 1:1:1, or 2:1:2.

Embodiment 8

Figure 17:
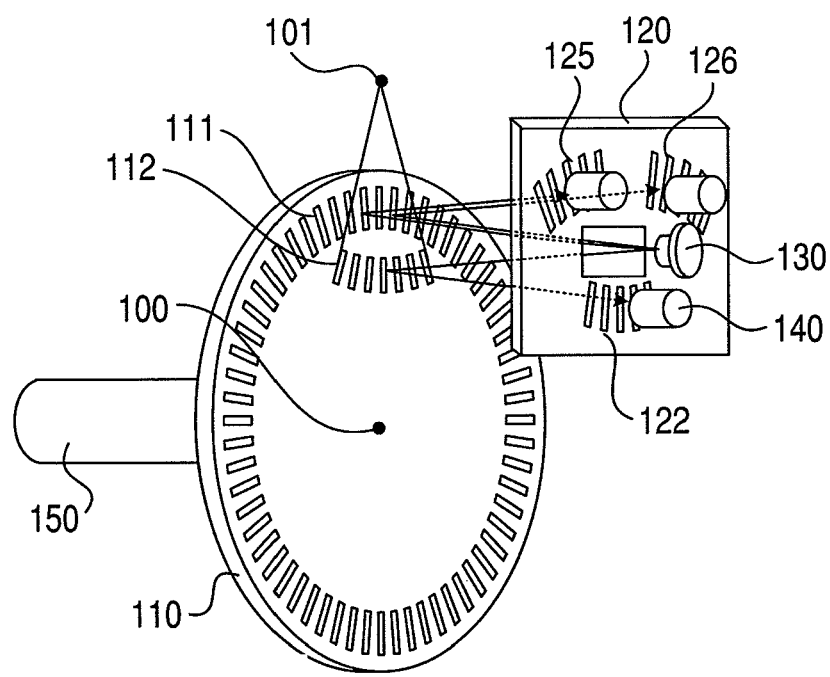
FIG. 17 is a perspective view of an encoder for an eighth embodiment of the present invention.

FIG. 17 is a perspective view of an encoder for an eighth embodiment of the present invention.

While referring to the drawing, reference numeral 112 denotes a rotary origin phase slit, and 122 denotes a fixed origin phase slit, as described above.

A difference of this invention from the second embodiment is: in the second embodiment, a pattern of linear slits arranged in parallel has been employed for the rotary origin phase slits 112 and the fixed origin phase slits 122. In this embodiment, slits that are radially arranged at equal pitches, so that the same angle is formed by all adjacent slits, are employed as rotary origin phase slits. A center 101, of a circular arc formed by the rotary origin phase slits, is located at a position different from that of a rotation center 100.

In this embodiment, the rotary origin phase slits 112 are arranged near rotary displacement detection slits 111, with the circular arc open to the outside. When the circular arc is open to the outside, a characteristic obtained is that a plurality of peaks seldom occurs near the origin, even when the rotary origin phase slits 112 are near the rotary displacement detection slits 111.

In addition, since only one light source 130 is required to irradiate the rotary origin phase slits 112 and the rotary displacement detection slits 111, and since the fixed origin phase slits 122 can be arranged near fixed displacement detection slits 125 and 126, the size of the detection section can be reduced.

Embodiment 9

Figure 18:
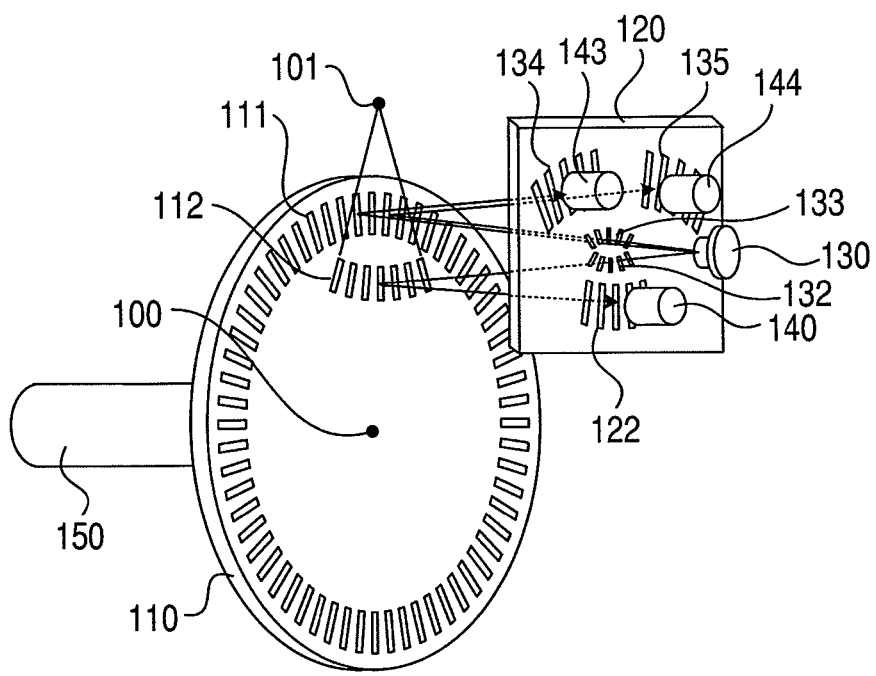
FIG. 18 is a perspective view of an encoder for a ninth embodiment of the present invention.
Figure 19:
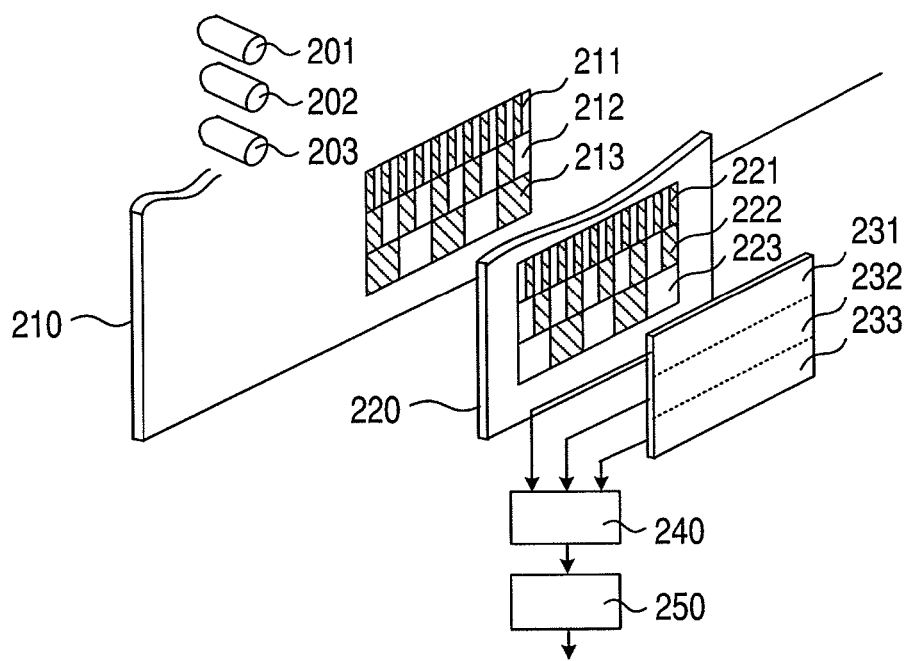
FIG. 19 is a perspective view of the arrangement of a reference position signal generator according to a first conventional example.
Figure 20:
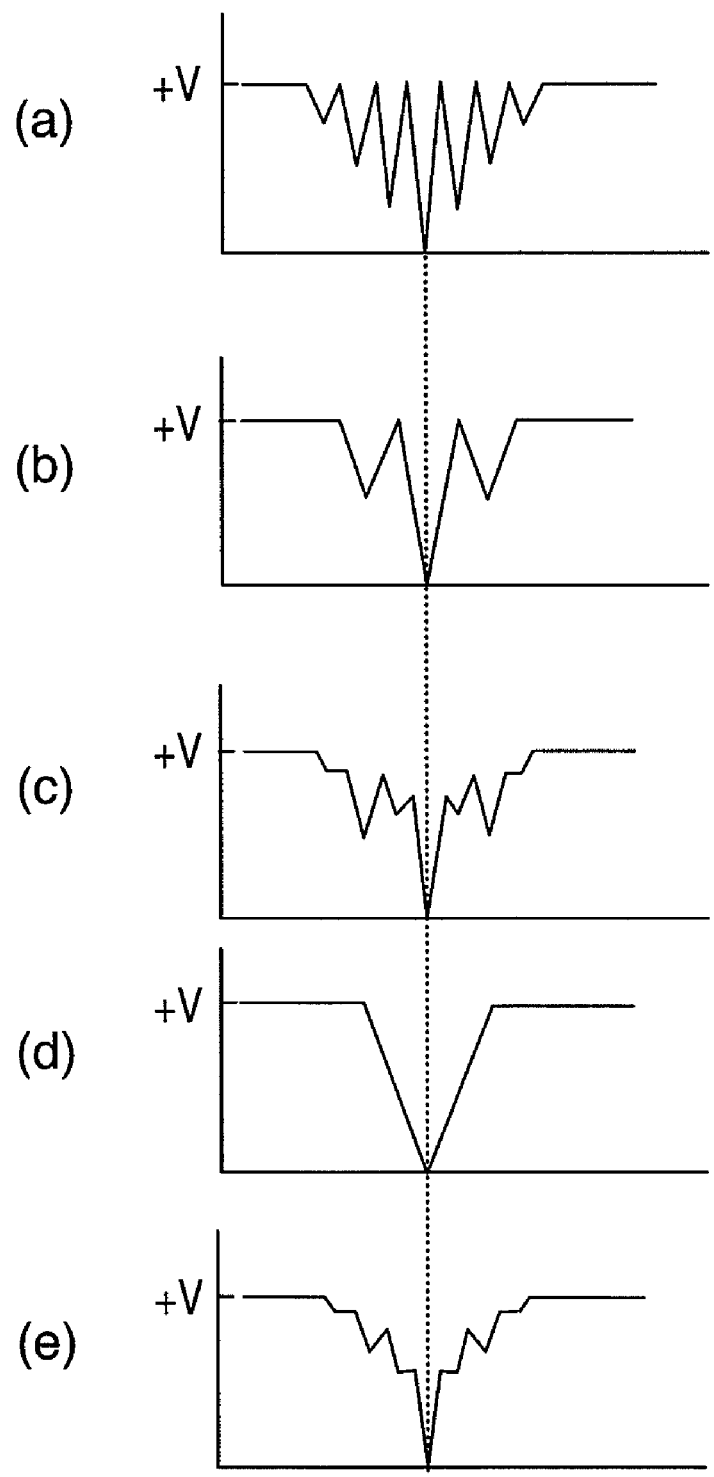
FIG. 20 is a schematic diagram illustrating the operation principle of the reference position signal generator of the first conventional example.
Figure 21:
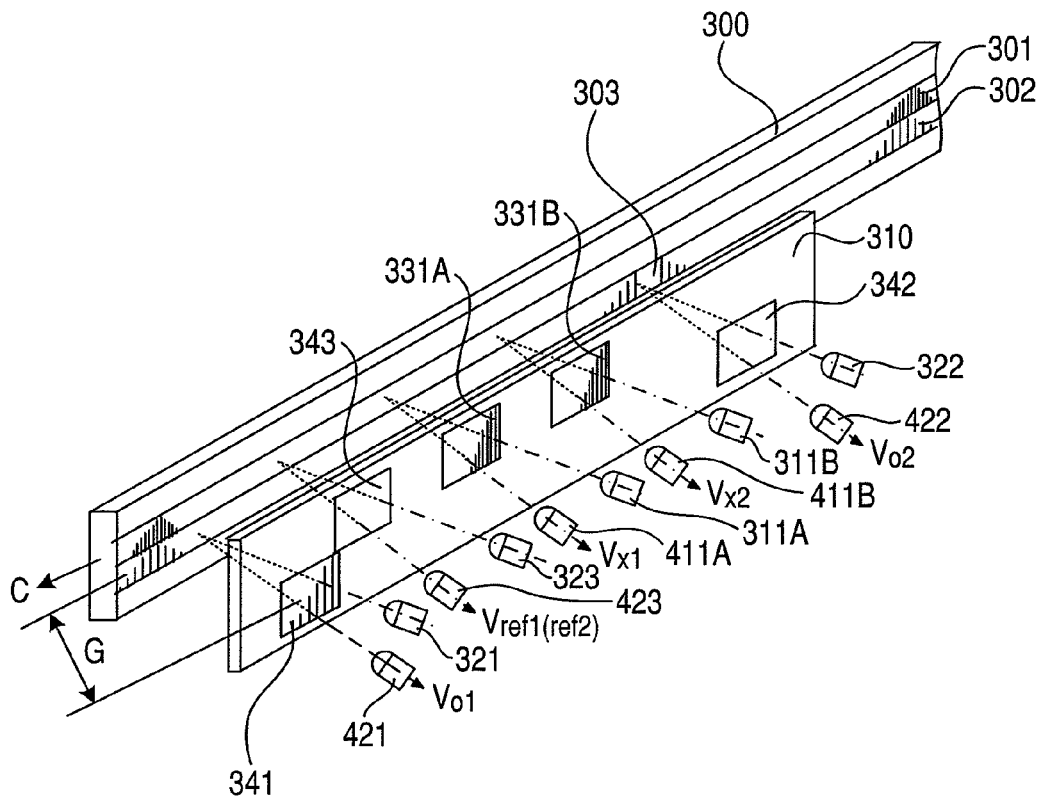
FIG. 21 is a perspective view of an encoder according to a second conventional example.
Figure 22:
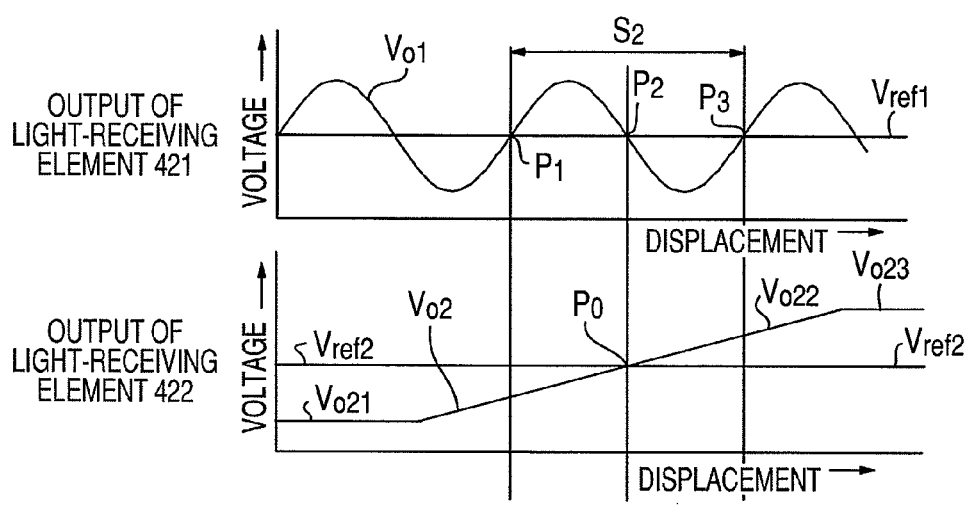
FIG. 22 is a signal waveform diagram illustrating the principle of the generation of an origin signal according to the second conventional example.
Figure 23:
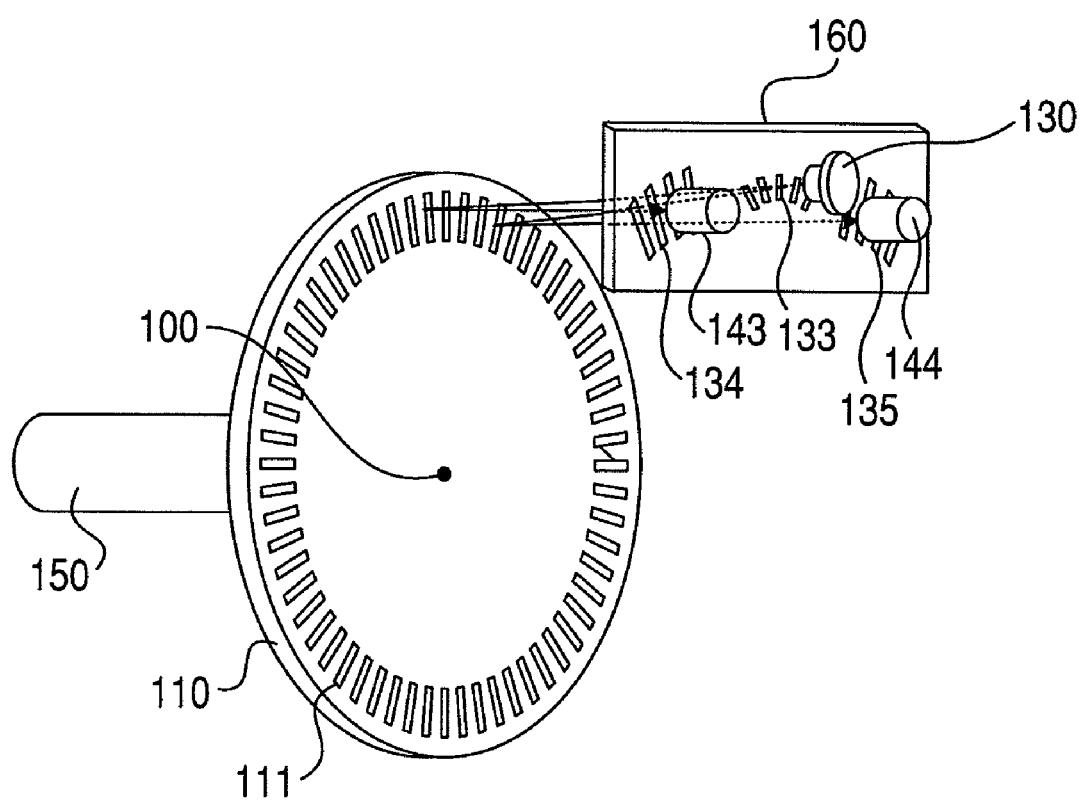
FIG. 23 is a perspective view of an optical rotary encoder according to a third conventional example.

FIG. 18 is a perspective view of an encoder for a ninth embodiment of the present invention.

While referring to the drawing, reference numeral 132 denotes an origin phase light source slit. A difference of this invention from the eighth embodiment is that the origin phase light source slits 132 are formed radially in a fixed scale 120.

The operation will now be described.

Light emitted by a light source 130 passes through the origin phase light source slits 132 and irradiates rotary origin phase slits 112. Light reflected at the rotary origin phase slits 112 forms interference fringes on fixed origin phase slits 122, and an origin phase light-receiving element 140 detects the interference fringes through the fixed origin phase slits 122. In this manner, the origin detection can be performed by a three-grid optical system using origin phase light source slits, rotary origin phase slits and fixed origin phase slits.

In addition, in this embodiment, the rotary origin phase slits 112 are formed near the rotary displacement detection slits 111. With this arrangement, the same light source can be employed for displacement detection and origin detection.

As described above, in this embodiment, the size of the detection section that includes the light-emitting element, the light-receiving element and the fixed scale can be reduced, and an encoder that is little affected by gap fluctuation, which is the feature of the three-grid optical system, can be provided. It should be noted that the origin phase light source slits, the rotary origin phase slits and the fixed origin phase slits may be formed at a ratio of pitches of either 1:1:1, or 2:1:2.

In the first to the ninth embodiments, a reflection type optical system has been employed; however, these embodiments can also be provided by using a transmission type optical system.

INDUSTRIAL APPLICABILITY

Since the absolute position of a rotary member can be detected with a simple arrangement, the present invention can be applied for a position detector of a servo motor that drives an industrial robot or a machine tool.

The invention claimed is:

1. An optical encoder for detecting a relative rotation angle for two members, comprising:
    a rotary disk provided for one of the two members that rotate relative to each other, and
    a light source, a fixed scale and a light-receiving element provided for the other of the two members, wherein
    the rotary disk is provided with rotary origin phase slits that are formed into a pattern of linear slits arranged in parallel at equal pitches, and
    the fixed scale is provided with fixed origin phase slits that are formed into a pattern of linear slits arranged in parallel at equal pitches with each other, the pattern of the fixed origin phase slits being provided at a position which is in parallel with the pattern of the rotary origin phase slits when the rotary disk is in an origin position.

2. The optical encoder according to claim 1, wherein
    the rotary origin phase slits are provided with the slit pattern displaced, in a direction of a short axis of the slits, from the rotation center of the rotary disk, and
    the fixed origin phase slits are provided with the slit pattern displaced, in the direction of the short axis of the slits, from the rotation center.

3. An optical encoder for detecting a relative rotation angle for two members, comprising:
    a rotary disk provided for one of the two members that rotate relative to each other, and
    a light source, a fixed scale and a light-receiving element provided for the other of the two members, wherein
    the rotary disk is provided with rotary origin phase slits that are formed into a pattern of linear slits arranged in parallel at equal pitches, and
    the fixed scale is provided with fixed origin phase slits that are formed into a pattern of linear slits arranged in parallel at equal pitches
    wherein
    the fixed origin phase slits are provided with a plurality of types of slit patterns arranged at different locations, in a direction of a long axis of the slits, from the rotation center of the rotary disk.

4. An optical encoder for detecting a relative rotation angle for two members, comprising:
    a rotary disk provided for one of the two members that rotate relative to each other, and
    a light source, a fixed scale and a light-receiving element provided for the other of the two members, wherein
    the rotary disk is provided with rotary origin phase slits that are formed into a pattern of linear slits arranged in parallel at equal pitches, and
    the fixed scale is provided with fixed origin phase slits that are formed into a pattern of linear slits arranged in parallel at equal pitches wherein
the rotary origin phase slits are provided with the slit pattern displaced, in a direction of a short axis of the slits, from the rotation center of the rotary disk, and
the fixed origin phase slits are provided with a plurality of types of the slit patterns that are displaced, in a direction of the short axis of the slits, from the rotation center, and that are located at different positions, in a direction of a long axis of the slits, from the rotation center.

5. An optical encoder for detecting a relative rotation angle for two members, comprising:
a rotary disk provided for one of the two members that rotate relative to each other, and
a light source, a fixed scale and a light-receiving element provided for the other of the two members, wherein
the rotary disk is provided with rotary origin phase slits that are formed into a pattern of linear slits arranged in parallel at equal pitches, and
the fixed scale is provided with fixed origin phase slits that are formed into a pattern of linear slits arranged in parallel at equal pitches
wherein
the fixed scale is provided with origin phase light source slits that are formed into a pattern of linear slits arranged in parallel and at equal pitches and that are located in a front face of the light source, and the fixed origin phase slits.

6. The optical encoder according to claim 5, wherein
the fixed origin phase slits are provided with a plurality of types of the slit patterns located at different positions, in a direction of a long axis of the slits, from the rotation center of the rotary disk.

7. The optical encoder according to claim 5, wherein
the rotary origin phase slits are provided with the slit pattern displaced, in a direction of a short axis of the slits, from the rotation center of the rotary disk, and
the fixed origin phase slits are provided with the slit pattern displaced, in the direction of the short axis of the slits, from the rotation center.

8. The optical encoder according to claim 5, wherein
the rotary origin phase slits are provided with the slit pattern displaced, in a direction of a short axis of the slits, from the rotation center of the rotary disk, and
the fixed origin phase slits are provided with a plurality of types of the slit patterns that are displaced from the rotation center in the direction of the short axis of the slits, and that are located at different positions, in a direction of a long axis of the slits, from the rotation center.

* * * * *